US012442795B1

(12) United States Patent
Qi et al.

(10) Patent No.: US 12,442,795 B1
(45) Date of Patent: Oct. 14, 2025

(54) METHOD AND SYSTEM FOR MONITORING STRUCTURAL DETERIORATION OF RESERVOIR ROCK MASS UNDER LONG-TIME HIGH-TEMPERATURE CONDITION, AND PRODUCT

(71) Applicant: INSTITUTE OF GEOLOGY AND GEOPHYSICS, CAS, Beijing (CN)

(72) Inventors: Shengwen Qi, Beijing (CN); Bowen Zheng, Beijing (CN); Guangming Luo, Beijing (CN); Wenjie Hao, Beijing (CN); Wei Lu, Beijing (CN); Yongchao Li, Beijing (CN); Guoliang Li, Beijing (CN); Wang Zhang, Beijing (CN); Bo Wan, Beijing (CN); Songfeng Guo, Beijing (CN); Ning Liang, Beijing (CN); Jianing Cong, Beijing (CN); Tianming Huang, Beijing (CN); Yanlong Kong, Beijing (CN); Xiaokun Hou, Beijing (CN); Zan Wang, Beijing (CN); Weiwei Zhu, Beijing (CN); Yu Zou, Beijing (CN); Lina Ma, Beijing (CN); Xin Yu, Beijing (CN)

(73) Assignee: INSTITUTE OF GEOLOGY AND GEOPHYSICS, CAS, Beijing (CN)

( * ) Notice: Subject to any disclaimer, the term of this patent is extended or adjusted under 35 U.S.C. 154(b) by 0 days.

(21) Appl. No.: 18/933,279

(22) Filed: Oct. 31, 2024

(51) Int. Cl.
*G01N 29/07* (2006.01)
*G01N 29/14* (2006.01)
(Continued)

(52) U.S. Cl.
CPC ............. *G01N 29/07* (2013.01); *G01N 29/14* (2013.01); *G01N 29/2437* (2013.01);
(Continued)

(58) Field of Classification Search
CPC .... G01N 29/07; G01N 29/14; G01N 29/2437; G01N 33/24; G01N 2291/011;
(Continued)

(56) References Cited

U.S. PATENT DOCUMENTS 6,823,736 B1 * 11/2004 Brock ................ G01N 29/0609
73/587
12,050,146 B2 * 7/2024 Burks .................. H10N 30/302

FOREIGN PATENT DOCUMENTS

CN        206594108     * 10/2017
CN        109613121 A * 4/2019 ............. G01N 29/14
(Continued)

OTHER PUBLICATIONS

Chinese Patent Office, Office Action received in CN Application No. 202410895321.6, Aug. 6, 2024, 18 pages (including translation).
(Continued)

*Primary Examiner* — Jacques M Saint Surin
(74) *Attorney, Agent, or Firm* — Suiter Swantz IP (57) ABSTRACT

A method and system for monitoring structural deterioration of a reservoir rock mass under a long-time high-temperature condition, and a product are provided. The method includes: arranging ultrasonic transducers and fiber optic extrinsic Fabry-Perot interferometric (EFPI) sensors in a loading briquette; loading ultrasonic waves on a rock mass sample with the ultrasonic transducers; monitoring ultrasonic and acoustic emission signals at the rock mass sample with the fiber optic EFPI sensors; inverting a velocity model indicating a change of a wave velocity inside the rock mass sample over time by fast marching acoustic emission tomography using standard optimization (FaATSO) according to the ultrasonic and acoustic emission signals; and conducting joint inversion by a fast-marching method according to the velocity model, the acoustic emission signals, and observa-
(Continued)

tion data to determine a position of rock mass fracturing in the rock mass sample.

10 Claims, 10 Drawing Sheets

(51) Int. Cl.
  *G01N 29/24* (2006.01)
  *G01N 33/24* (2006.01)
(52) U.S. Cl.
  CPC ....... *G01N 33/24* (2013.01); *G01N 2291/011* (2013.01); *G01N 2291/023* (2013.01); *G01N 2291/0289* (2013.01); *G01N 2291/106* (2013.01)
(58) Field of Classification Search
  CPC ..... G01N 2291/023; G01N 2291/0289; G01N 2291/106
  USPC .......................................................... 73/587
  See application file for complete search history.

(56) References Cited

FOREIGN PATENT DOCUMENTS

| CN | 112986390 | * | 6/2021 | |
|---|---|---|---|---|
| CN | 118153416 | * | 6/2024 | ............... G06N 3/08 |

OTHER PUBLICATIONS

Guang, "Research on Macro and Micro Characteristics of Sandstone Deformation and Destruction Mechanical Behavior," China Doctoral Dissertation Full Text Database Engineering Technology Series I, No. 4, Apr. 15, 2024, 38 pages.

Wanwan et al., "Ultrasonic Detection of Water Content in Rock Mass Based on FBG-FPI Optical Fiber Sensor," Journal of Optics, etc., vol. 44, Apr. 30, 2024, 8 pages.

\* cited by examiner

METHOD AND SYSTEM FOR MONITORING STRUCTURAL DETERIORATION OF RESERVOIR ROCK MASS UNDER LONG-TIME HIGH-TEMPERATURE CONDITION, AND PRODUCT

CROSS REFERENCE TO RELATED APPLICATION

This patent application claims the benefit and priority of Chinese Patent Application No. 2024108953216, filed with the China National Intellectual Property Administration on Jul. 5, 2024, the disclosure of which is incorporated by reference herein in its entirety as part of the present application.

TECHNICAL FIELD

The present disclosure relates to the field of engineering geomechanics of reservoir rock masses, and in particular to a method and system for monitoring structural deterioration of a reservoir rock mass under a long-time high-temperature condition, and a product.

BACKGROUND

In the research field of engineering geomechanics of reservoir rock masses, when injected into an underground rock mass, a fluid may induce the initiation of fractures and the expansion of existing fractures, such that a complicated fracture network is formed to cause the structural deterioration of the rock mass. The structural deterioration of a rock mass will cause the deformation and strength property deterioration of the rock mass, thereby affecting the stability of a reservoir.

For the quantitative characterization of structural deterioration of a rock mass, the current feasible test techniques include X-ray computed tomography, nuclear magnetic resonance, geophysical exploration, acoustic emission monitoring, or the like. An image resolution or a test accuracy of either the X-ray computed tomography or the nuclear magnetic resonance is inversely proportional to a sample size and a scanning time, and the long-time scanning can cause the distortion of results. The geophysical exploration technique, such as seismic velocity detection and electrical resistivity tomography, is also an effective means to determine a rock mass structure and a fracture structure. However, this technique has the disadvantage that an inversion result has non-uniqueness and large uncertainty. In the acoustic emission monitoring technique, a stress wave signal generated due to fracturing inside a rock mass can be acquired and processed by an acoustic emission probe to directly reveal a law of a fracturing evolution inside the rock mass. Most of the current acoustic emission probes adopt a piezoelectric ceramic transducer. However, the problem that a piezoelectric ceramic undergoes performance deterioration at a high temperature has not been effectively solved.

In addition, the premise of investigating the microcrack propagation of a rock mass is to determine a location of an acoustic emission signal of the rock mass. Currently, in most cases, the classical source location method is adopted for locating, and an inversion equation is simplified into a linear form based on the assumption of a uniform velocity model. However, under long-time test conditions, location results are unsatisfactory, which is attributed to factors such as first arrival of a stress wave, a signal-to-noise ratio, a velocity model and a travel time algorithm, and an inversion optimization strategy.

Therefore, in order to accurately characterize a structural deterioration process of a rock mass under a long-time high-temperature condition in the research field of engineering geomechanics of reservoir rock masses, it is urgent to provide a system for detecting and monitoring structural deterioration of a reservoir rock mass.

SUMMARY

An objective of the present disclosure is to provide a method and system for monitoring structural deterioration of a reservoir rock mass under a long-time high-temperature condition, and a product, which can improve an accuracy of monitoring a structural deterioration process of a rock mass under a long-time high-temperature condition and improve an accuracy of locating.

In order to allow the above objective, the present disclosure provides the following solutions: A method for monitoring structural deterioration of a reservoir rock mass under a long-time high-temperature condition is provided, including: arranging ultrasonic transducers and fiber optic extrinsic Fabry-Perot interferometric (EFPI) sensors oppositely in a loading briquette, where the fiber optic EFPI sensors each are in contact with a rock mass sample in the loading briquette through a sensor channel in the loading briquette; the ultrasonic transducers include: longitudinal (P)-wave ultrasonic transducers and transverse (S)-wave ultrasonic transducers; and a P-wave ultrasonic transducer and an S-wave ultrasonic transducer are arranged in a same direction of the loading briquette;

loading ultrasonic waves on the rock mass sample with the ultrasonic transducers;
monitoring ultrasonic and acoustic emission signals at the rock mass sample with the fiber optic EFPI sensors;
inverting a velocity model indicating a change of a wave velocity inside the rock mass sample over time by fast marching acoustic emission tomography using standard optimization (FaATSO) according to the ultrasonic and acoustic emission signals; and
conducting joint inversion by a fast-marching method according to the velocity model, the acoustic emission signals, and observation data to determine a position of rock mass fracturing in the rock mass sample, where the observation data includes: coordinates of the fiber optic EFPI sensors and an active/passive arrival time.

Optionally, the loading ultrasonic waves on the rock mass sample with the ultrasonic transducers specifically includes: conducting an ultrasonic detection once at a specific interval; and
for an operating mode of multi-stage loading, conducting an ultrasonic detection when a pressure value at each stage is stabilized.

Optionally, the conducting joint inversion by a fast-marching method according to the velocity model, the acoustic emission signals, and observation data to determine a position of rock mass fracturing in the rock mass sample specifically includes: conducting the joint inversion by the fast-marching method according to the velocity model, the acoustic emission signals, and the observation data to determine a theoretical arrival time;
determining an arrival time residual between the theoretical arrival time and a signal arrival time obtained according to the ultrasonic and acoustic emission signals, and determining a minimum arrival time residual within a detection range, where the minimum arrival time residual refers to the position of the rock mass fracturing in the rock mass sample;

determining whether the minimum arrival time residual meets an error;

if the minimum arrival time residual meets the error, taking the position of the rock mass fracturing in the rock mass sample determined after the active and passive joint inversion; and if the minimum arrival time residual does not meet the error, inverting the velocity model by a quasi-Newton method in combination with the minimum arrival time residual, and with an inverted velocity model instead of the current velocity model, repeating the step of conducting the joint inversion by the fast-marching method according to the velocity model, the acoustic emission signals, and the observation data to determine a theoretical arrival time until a final minimum arrival time residual meets the error.

A system for monitoring structural deterioration of a reservoir rock mass under a long-time high-temperature condition applied to the method for monitoring structural deterioration of a reservoir rock mass under a long-time high-temperature condition described above is provided, where the system includes: ultrasonic transducers, fiber optic EFPI sensors, a data acquisition module, a central processing module, a data communication module, and a master computer;

the ultrasonic transducers each are configured to load an ultrasonic wave on a rock mass sample;

the fiber optic EFPI sensors are connected with the ultrasonic transducers and the data acquisition module; the fiber optic EFPI sensors each are configured to monitor ultrasonic and acoustic emission signals at the rock mass sample;

the central processing module is connected with the fiber optic EFPI sensors, the data acquisition module, and the ultrasonic transducers; the central processing module is configured to: get the ultrasonic and the acoustic emission signals acquired by the data acquisition module, invert a velocity model indicating a change of a wave velocity inside the rock mass sample over time by FaATSO according to the ultrasonic and acoustic emission signals, and conduct joint inversion by a fast-marching method according to the velocity model, the acoustic emission signals, and observation data to determine a position of rock mass fracturing in the rock mass sample; the central processing module is further configured to send an excitation instruction to the ultrasonic transducers; and the master computer communicates with the central processing module and the fiber optic EFPI sensors through the data communication module.

Optionally, the data acquisition module includes: an ultrasonic transmitting card and an acoustic emission acquisition card.

Optionally, the ultrasonic transmitting card is an AD-IPR-1210 ultrasonic transmitting card.

Optionally, the acoustic emission acquisition card is a PCI-2 acoustic emission acquisition card.

Optionally, the ultrasonic transducers simulate an active source in a form of a sharp-wave pulse, a pulse output voltage is 500 V, and waveforms are superimposed 25 times during pulse excitation.

A computer program product is provided, including a computer program, where when executed by a processor, the computer program implements the method for monitoring structural deterioration of a reservoir rock mass under a long-time high-temperature condition described above.

According to the specific embodiments provided by the present disclosure, the present disclosure discloses the following technical effects: In the method and system for monitoring structural deterioration of a reservoir rock mass under a long-time high-temperature condition, and a product, ultrasonic transducers based on a piezoelectric effect and fiber optic EFPI sensors based on a micro-electromechanical system (MEMS) are adopted to intuitively acquire information such as a wave velocity structure and crack propagation parameters inside a rock mass in real time. A velocity model indicating a change of a wave velocity inside a rock mass sample over time is inverted by FaATSO according to ultrasonic and acoustic emission signals. That is, with an active source (ultrasonic)/passive source (acoustic emission) joint detection and monitoring technology and fiber optic acoustic emission sensors that adapt to high-temperature and long-time working environments, the present disclosure provides a technology where P-wave and S-wave velocity fields inside a rock mass are detected in combination through a continuous acoustic emission monitoring process, such that the whole deterioration process inside the rock mass can be finely and quantitatively characterized through the joint inversion of a velocity model updated in real time and acoustic emission signals. A change of a velocity model can also characterize the formation and propagation processes of a fracture network, and can subjected to mutual verification with indexes such as temporal and spatial distributions of stress, strain, and acoustic emission events, so as to allow the real-time dynamic tracking of the whole process of deforming, damaging, and fracturing of a rock mass. The present disclosure can improve an accuracy of monitoring a structural deterioration process of a rock mass under a long-time high-temperature condition and improve an accuracy of locating.

BRIEF DESCRIPTION OF THE DRAWINGS

To describe the technical solutions in the embodiments of the present disclosure or in the prior art clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method and system for monitoring structural deterioration of a reservoir rock mass under a long-time high-temperature condition, and a product, which can improve an accuracy of monitoring a structural deterioration process of a rock mass under a long-time high-temperature condition and improve an accuracy of locating.

In order to make the above objective, features, and advantages of the present disclosure clear and comprehensible, the present disclosure will be further described in detail below in combination with accompanying drawings and specific implementations.

Example 1

Figure 1:
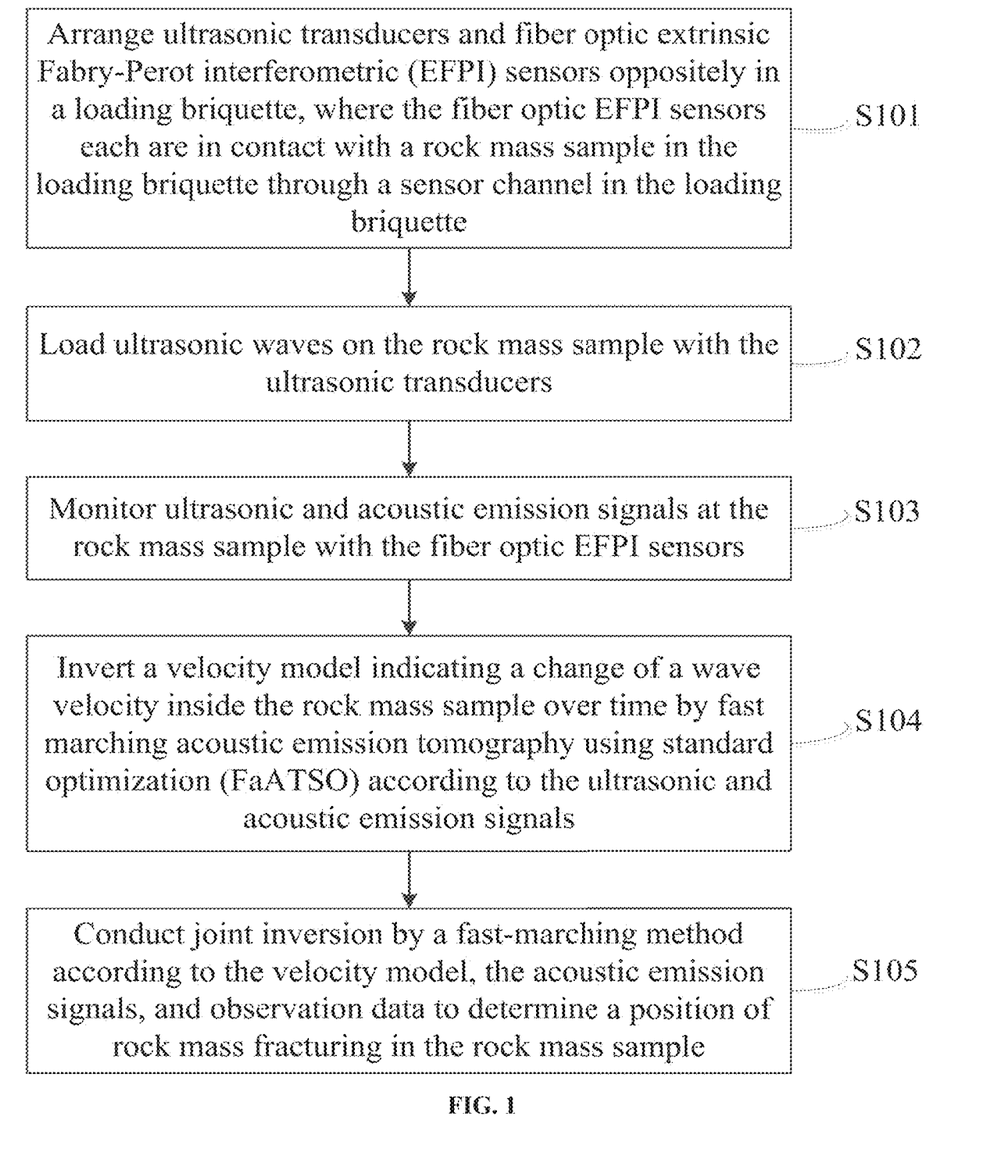
FIG. 1 is a schematic flow chart of the method for monitoring structural deterioration of a reservoir rock mass under a long-time high-temperature condition provided in Example 1 of the present disclosure.
Figure 2A:
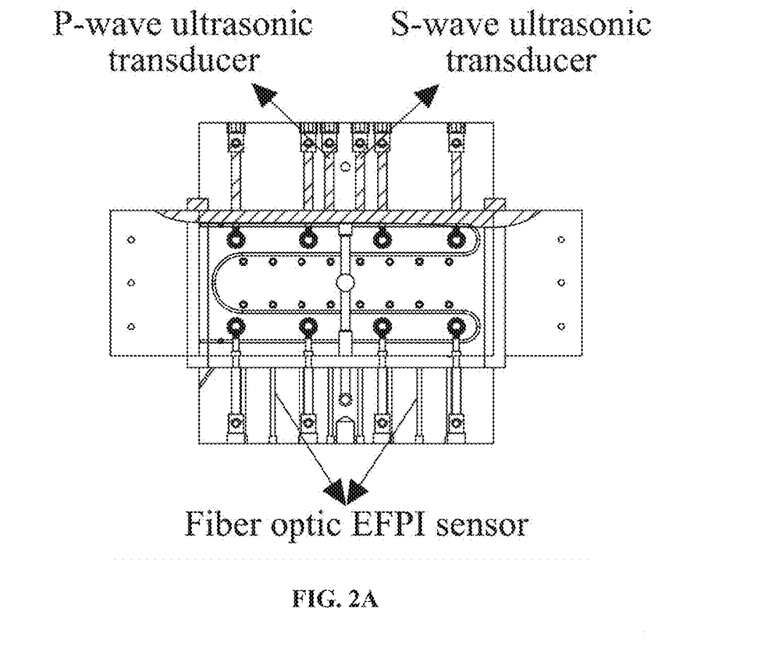
FIGS. 2A-2B are schematic diagrams of a layout mode of ultrasonic detection and acoustic emission monitoring for a rock mass.
Figure 2B:
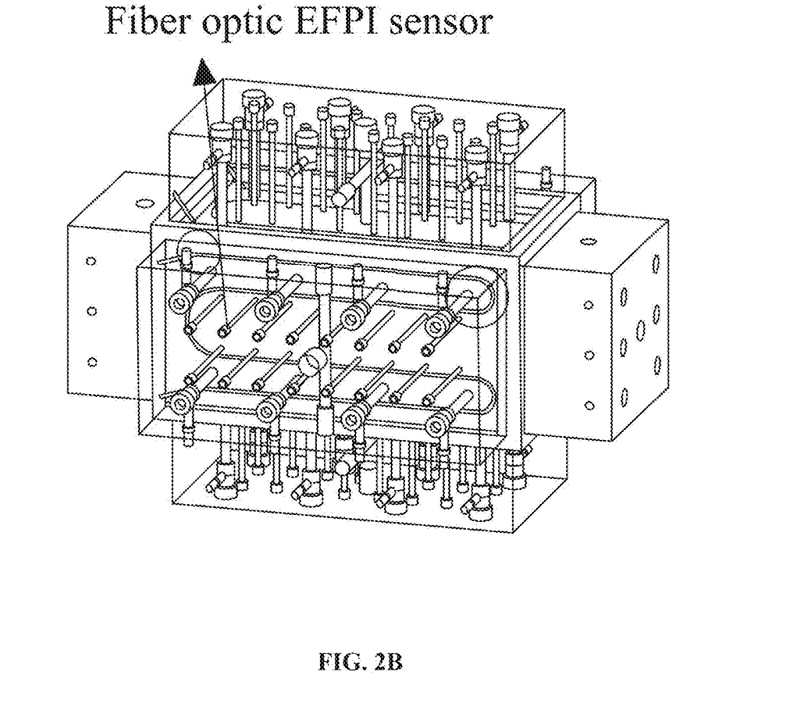

As shown in FIG. 1, the present disclosure provides a method for monitoring structural deterioration of a reservoir rock mass under a long-time high-temperature condition, including: S101: Ultrasonic transducers and fiber optic EFPI sensors are arranged oppositely in a loading briquette, as shown in FIGS. 2A-2B. The fiber optic EFPI sensors each are in contact with a rock mass sample in the loading briquette through a sensor channel in the loading briquette. The ultrasonic transducers include: P-wave ultrasonic transducers and S-wave ultrasonic transducers. A P-wave ultrasonic transducer and an S-wave ultrasonic transducer are arranged in a same direction of the loading briquette. The fiber optic EFPI sensors are evenly spaced in the loading briquette, and only one fiber optic EFPI sensor is arranged in each fiber optic channel.

S102: Ultrasonic waves are loaded on the rock mass sample with the ultrasonic transducers.

Figure 3:
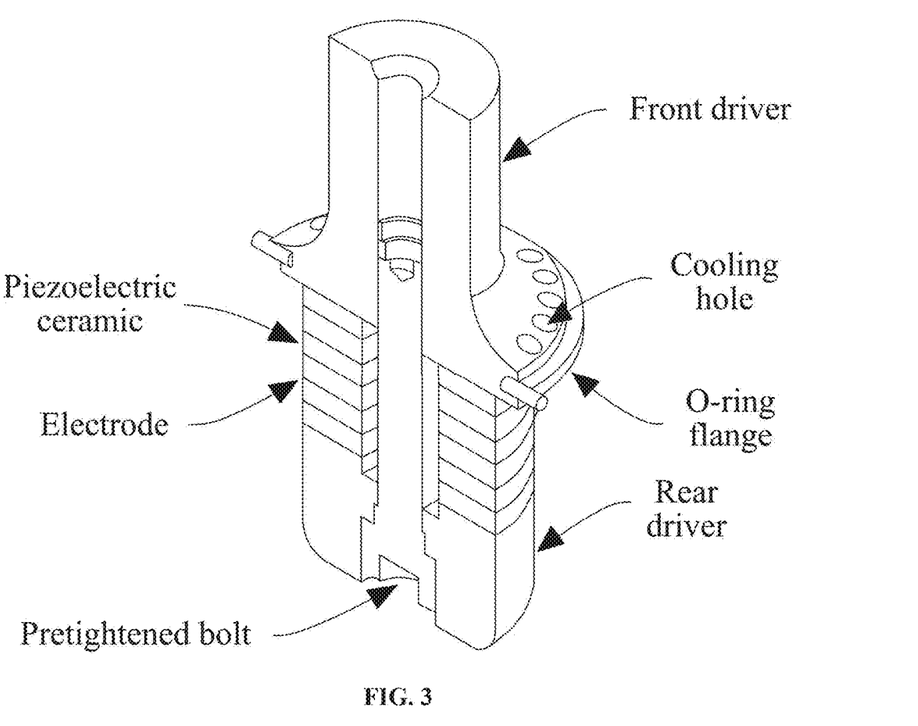
FIG. 3 is a schematic structural diagram of an ultrasonic transducer.
Figure 4:
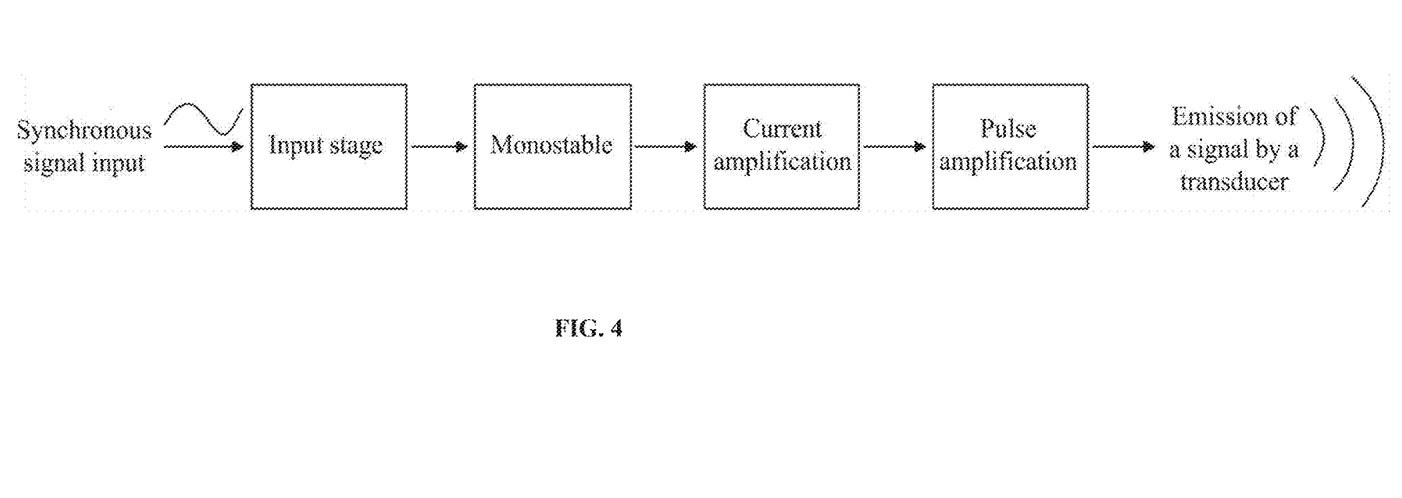
FIG. 4 is a block diagram of a circuit theory of an ultrasonic transducer.

As shown in FIG. 3 and FIG. 4, the ultrasonic transducers based on a piezoelectric effect can convert an input electrical power into a mechanical power (namely, ultrasonic waves) to allow ultrasonic tomography for the rock mass. The ultrasonic transducers each include a piezoelectric material, an electrode, an acoustic matching layer, a backing, a flexible circuit board, a shell, or the like, and are applicable to measurements under high-temperature and high-pressure conditions. Waveforms that can be excited by the ultrasonic transducers include square pulses, sharp pulses, and modulating pulses, with an excitation voltage range of 50 V to 400 V, a pulse width of 20 ns to 400 ns, a resolution of 5 ns, a repetition frequency of 2,000/s, and impedance types of 1Ω, 100Ω, and higher than 10 kΩ.

Figure 7:
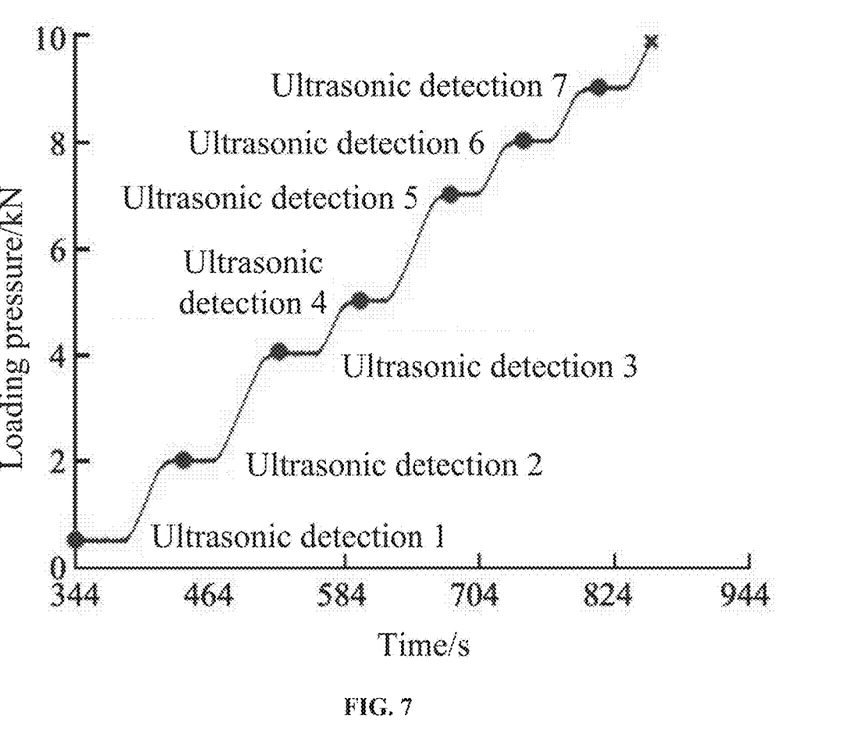
FIG. 7 is a schematic diagram of detection steps of an ultrasonic transducer.

As shown in FIG. 7, the loading ultrasonic waves on the rock mass sample with the ultrasonic transducers specifically includes: an ultrasonic detection is conducted once at a specific interval.

For an operating mode of multi-stage loading, an ultrasonic detection is conducted when a pressure value at each stage is stabilized. The numbers in FIG. 7 represent an order and a number of ultrasonic detections.

S103: Ultrasonic and acoustic emission signals at the rock mass sample are monitored with the fiber optic EFPI sensors.

Figure 5:
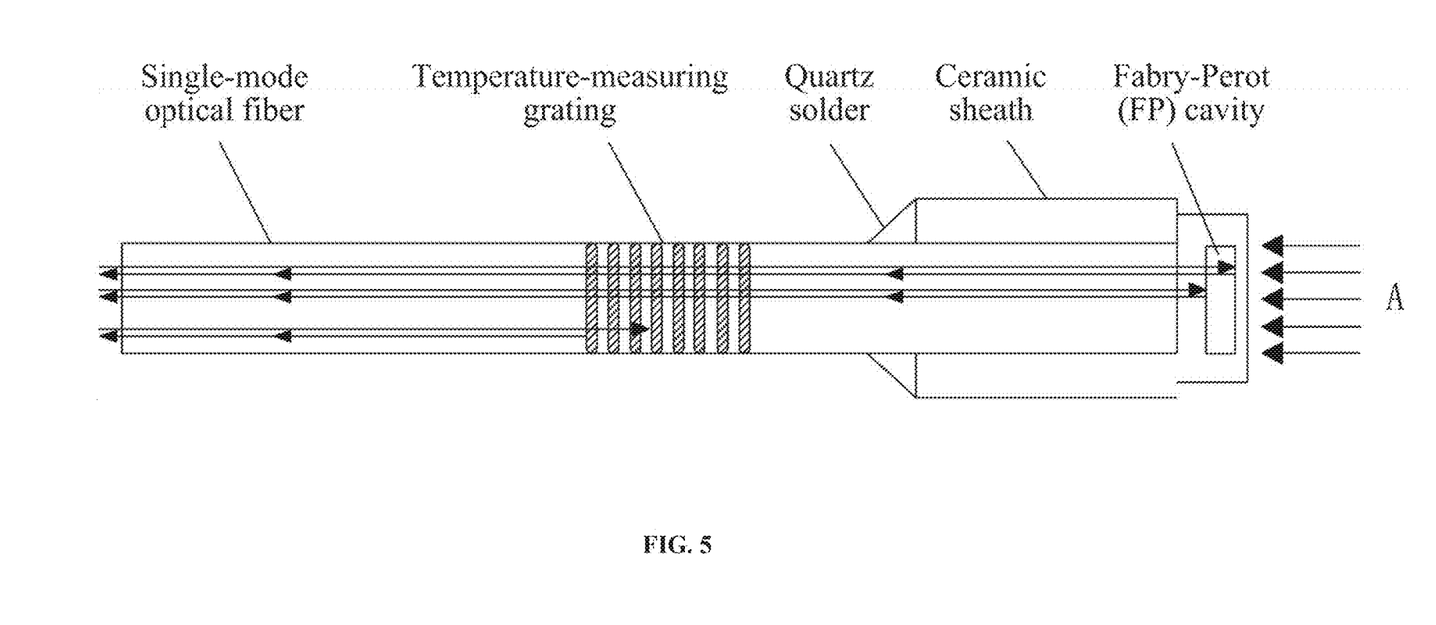
FIG. 5 is a schematic diagram of a model of a fiber optic EFPI sensor.
Figure 6:
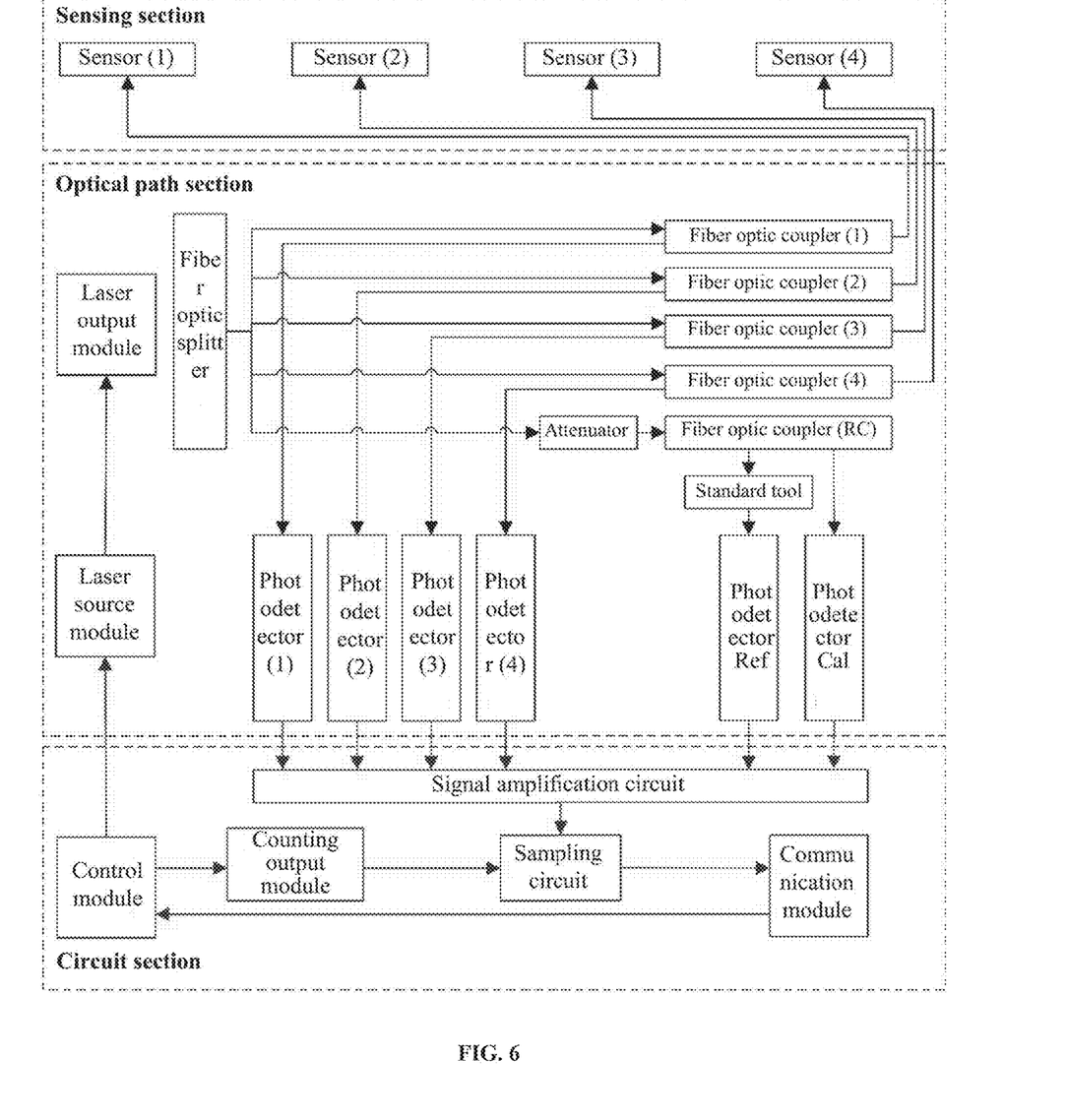
FIG. 6 is a schematic diagram of a demodulation principle of a fiber optic EFPI sensor.

As shown in FIG. 5 and FIG. 6, the fiber optic EFPI sensors based on MEMS are adopted to receive ultrasonic and acoustic emission signals. A vibration demodulation technology with a sampled-grating distributed-Bragg-reflector tunable laser as a light source is adopted. The tunable laser emits a scanning laser beam with a fixed step size according to signal requirements of a control module, and the laser beam is modulated by a laser output module and then enters a fiber optic splitter. The control module of the tunable laser sends a pulse signal to a counting output module while sending a control signal, and the counting output module outputs a counting signal to a sampling circuit after receiving the pulse signal. After receiving a laser beam output by the laser, the fiber optic splitter divides the laser beam into laser beams for n channels, the laser beams enter three-port fiber optic couplers of the n channels, respectively, and the three-port fiber optic couplers output the laser beams to the corresponding fiber optic EFPI sensors. When a vibration signal acts on a diaphragm of a sensor, a length of a Fabry-Perot (FP) cavity changes to generate an interference spectrum. A reflected laser beam is returned along the original optical path and enters a corresponding photodetector through a fiber optic coupler, and the photodetector converts a received reflected laser beam into an electrical signal and inputs the electrical signal into an amplification circuit. The amplification circuit amplifies the received electrical signal and outputs an amplified electrical signal to the sampling circuit, and the sampling circuit conducts data sampling for the amplified electrical signal with the counting signal. Sampling data is transmitted to the communication module to allow information transmission with a monitoring host, and software of the monitoring host conducts restoration of a waveform spectrum through computing. Ultrasonic and acoustic emission signals are restored through a vibration signal of an environment in which a sensor reflecting a waveform spectrum is located.

S104: A velocity model indicating a change of a wave velocity inside the rock mass sample over time is inverted by FaATSO according to the ultrasonic and acoustic emission signals.

S105: Joint inversion is conducted by a fast-marching method according to the velocity model, the acoustic emission signals, and observation data to determine a position of rock mass fracturing in the rock mass sample. The observation data includes: coordinates of the fiber optic EFPI sensors and an active/passive arrival time.

Periodic active-source (ultrasonic) signal detection and continuous passive-source (acoustic emission) signal monitoring are conducted while a rock mass is loaded. The fiber optic EFPI sensors can conduct continuous acoustic emission signal acquisition and conduct an ultrasonic detection once at a specific interval after a test starts. During an ultrasonic detection, the ultrasonic transducers simulate an active source in a form of a sharp-wave pulse, a pulse output voltage is set to 500 V, and during pulse excitation, waveforms are superimposed 25 times to improve a signal-to-noise ratio. The fiber optic EFPI sensors, as receiving sensors, can acquire an ultrasonic wave velocity change during a loading process of a rock mass.

Figure 8:
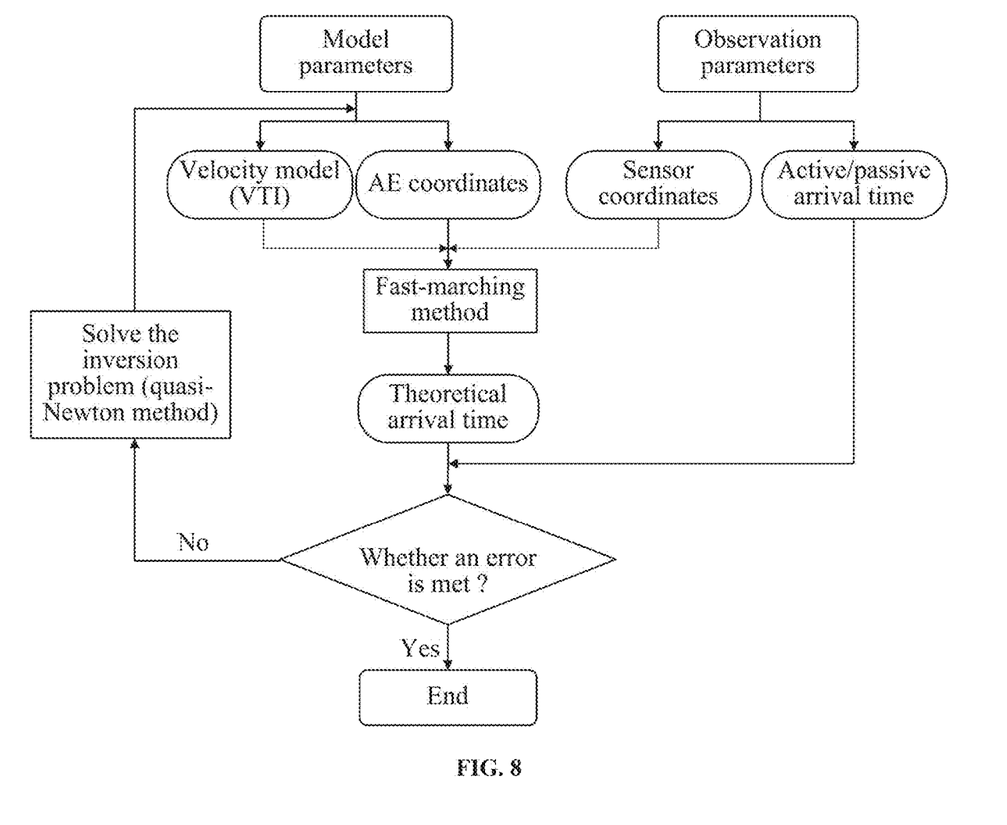
FIG. 8 is a flow chart of wave velocity/acoustic emission joint inversion.

As shown in FIG. 8, S106 specifically includes: The joint inversion is conducted by the fast-marching method according to the velocity model, the acoustic emission signals, and the observation data to determine a theoretical arrival time.

An arrival time residual between the theoretical arrival time and a signal arrival time obtained according to the ultrasonic and acoustic emission signals is determined, and a minimum arrival time residual is determined within a detection range. The minimum arrival time residual refers to the position of the rock mass fracturing in the rock mass sample.

Whether the minimum arrival time residual meets an error is determined.

If the minimum arrival time residual meets the error, the position of the rock mass fracturing in the rock mass sample determined after the active and passive joint inversion is taken.

If the minimum arrival time residual does not meet the error, the velocity model is inverted by a quasi-Newton method in combination with the minimum arrival time residual, and with an inverted velocity model instead of the current velocity model, the step of conducting the joint inversion by the fast-marching method according to the velocity model, the acoustic emission signals, and the observation data to determine a theoretical arrival time is repeated until a final minimum arrival time residual meets the error.

Example 2

Figure 9:
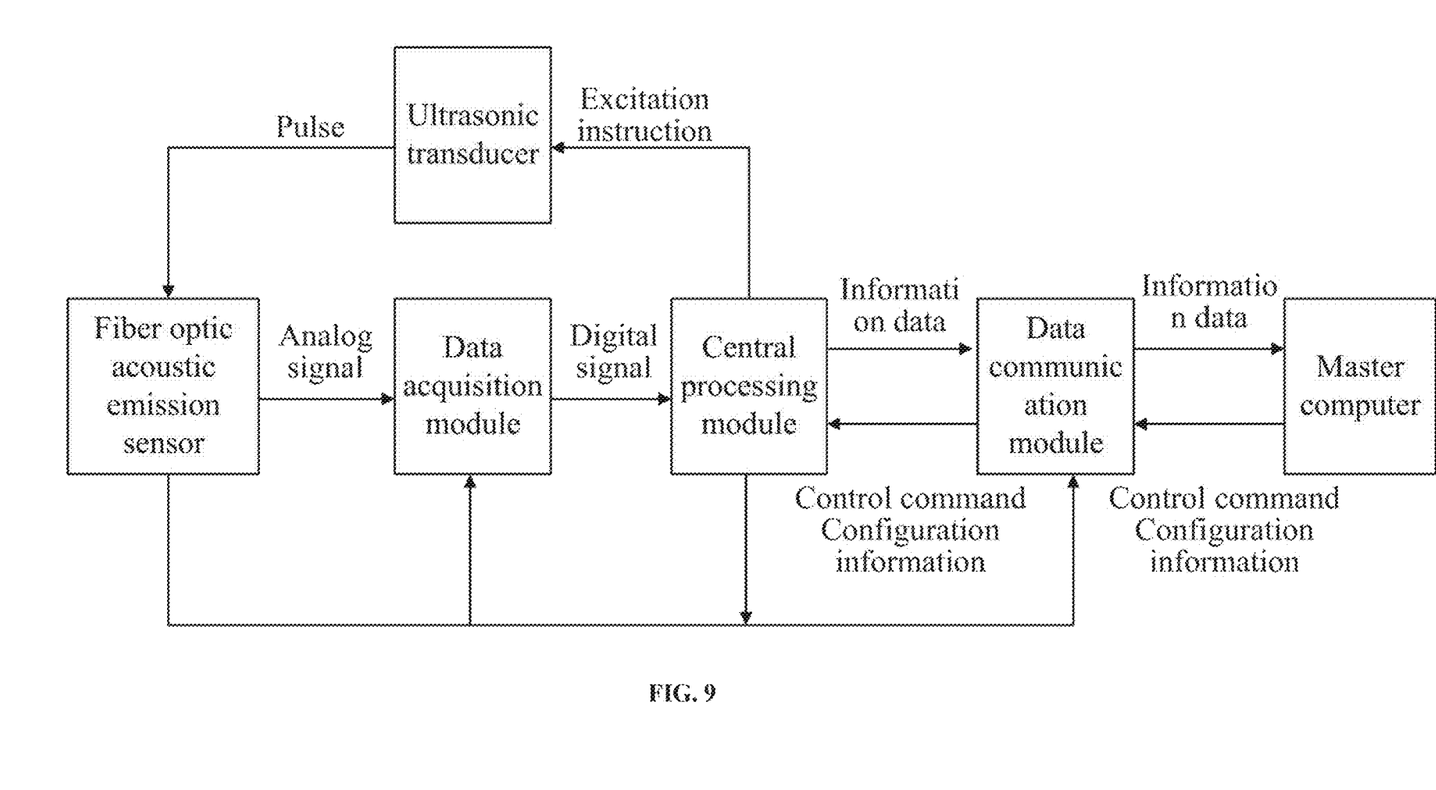
FIG. 9 is a schematic structural diagram of a system for monitoring structural deterioration of a reservoir rock mass under a long-time high-temperature condition.
Figure 10:
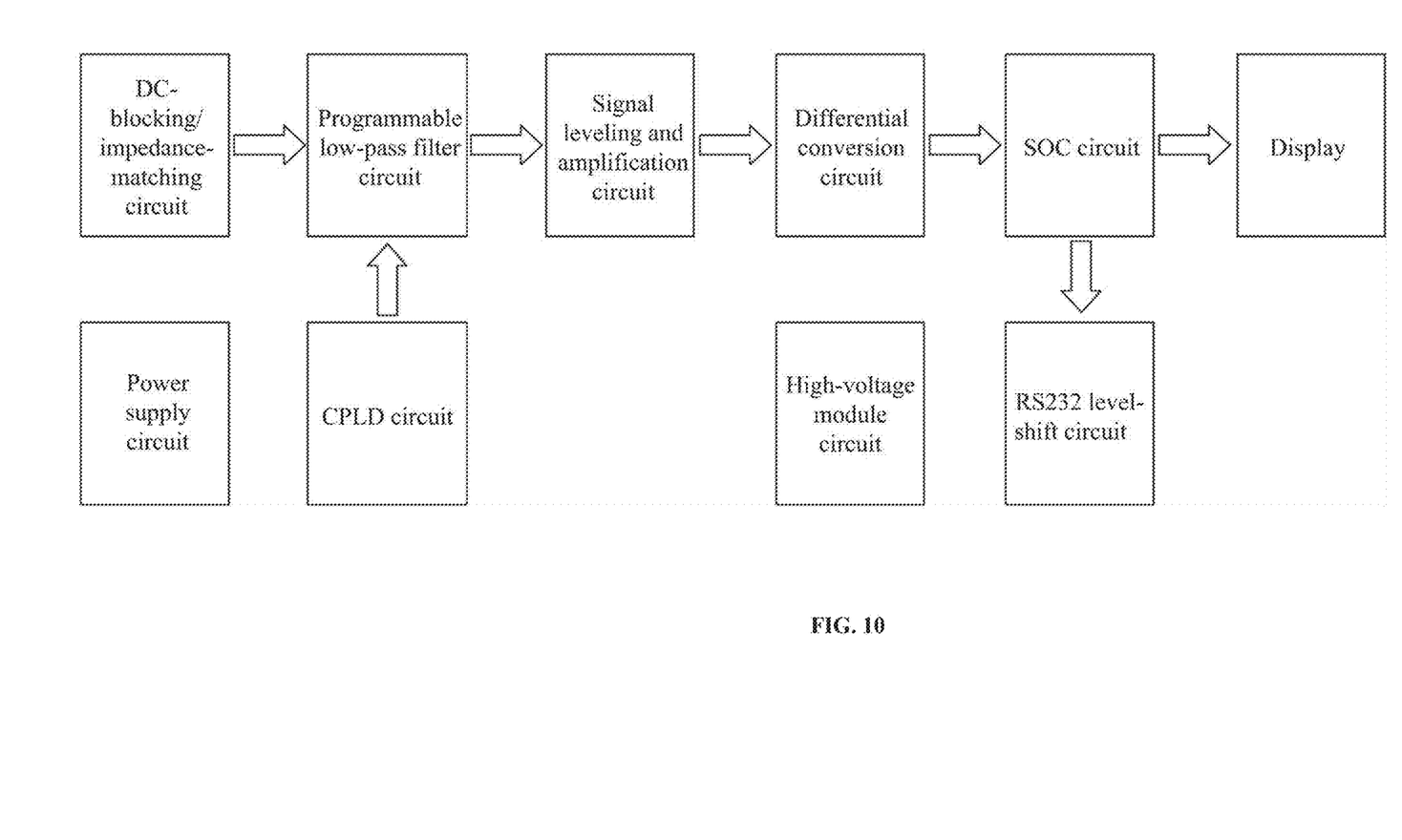
FIG. 10 is a schematic circuit diagram of a central processing module.

As shown in FIG. 9, the present disclosure provides a system for monitoring structural deterioration of a reservoir rock mass under a long-time high-temperature condition applied to the method for monitoring structural deterioration of a reservoir rock mass under a long-time high-temperature condition described above. The system includes: ultrasonic transducers, fiber optic EFPI sensors, a data acquisition module, a central processing module, a data communication module, and a master computer.

The ultrasonic transducers each are configured to load an ultrasonic wave on a rock mass sample.

The fiber optic EFPI sensors are connected with the ultrasonic transducers and the data acquisition module. The fiber optic EFPI sensors each are configured to monitor ultrasonic and acoustic emission signals at the rock mass sample.

The central processing module is connected with the fiber optic EFPI sensors, the data acquisition module, and the ultrasonic transducers. The central processing module is configured to: get the ultrasonic and acoustic emission signals acquired by the data acquisition module, invert a velocity model indicating a change of a wave velocity inside the rock mass sample over time by FaATSO according to the ultrasonic and acoustic emission signals, and conduct joint inversion by a fast-marching method according to the velocity model, the acoustic emission signals, and observation data to determine a position of rock mass fracturing in the rock mass sample. The central processing module is further configured to send an excitation instruction to the ultrasonic transducers.

The master computer communicates with the central processing module and the fiber optic EFPI sensors through the data communication module.

The data acquisition module and the central processing module constitute a data processing host. A structure of the central processing module is shown in FIG. 9. The data acquisition module includes: an ultrasonic transmitting card and an acoustic emission acquisition card.

The ultrasonic transmitting card is an AD-IPR-1210 ultrasonic transmitting card. The AD-IPR-1210 ultrasonic transmitting card has a 14-bit digital-to-analog conversion (D/A) accuracy and a sampling rate of 100 MHz.

The acoustic emission acquisition card is a PCI-2 acoustic emission acquisition card. The PCI-2 acoustic emission acquisition card has a 18-bit analog-to-digital conversion (A/D) accuracy, a sampling rate of 10 MHz, and a bandwidth of 1 kHz to 3 MHz.

Periodic active-source (ultrasonic) signal detection and continuous passive-source (acoustic emission) signal monitoring are conducted while a rock mass is loaded. The fiber optic EFPI sensors can conduct continuous acoustic emission signal acquisition and conduct an ultrasonic detection once at a specific interval after a test starts. During an ultrasonic detection, the ultrasonic transducers simulate an active source in a form of a sharp-wave pulse, a pulse output voltage is set to 500 V, and during pulse excitation, waveforms are superimposed 25 times to improve a signal-to-noise ratio. The fiber optic EFPI sensors, as receiving sensors, can acquire an ultrasonic wave velocity change during a loading process of a rock mass.

Example 3

A computer program product is provided, including a computer program. When executed by a processor, the computer program implements the method for monitoring structural deterioration of a reservoir rock mass under a long-time high-temperature condition in Example 1.

It should be noted that information of an object (including, but not limited to, device information of the object, personal information of the object, or the like) and data (including, but not limited to, data for analysis, data for storage, data for exhibition, or the like) in the present disclosure are information and data authorized by the object or fully authorized by each party, and relevant data shall be acquired, used, and processed according to laws, regulations, and standards of related countries and regions.

Those of ordinary skill in the art may understand that all or some of the procedures in the method of the above example may be implemented by a computer program instructing related hardware. The computer program may be stored in a non-volatile computer-readable storage medium. When the computer program is executed, the process of the method in the above example may be implemented. Any reference to the memory, the database, or other media used in the embodiments of the present disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, or the like. The volatile memory may include a random access memory (RAM) or an external cache memory. As an illustration rather than a limitation, the RAM may be in various forms, such as a static random access memory (SRAM) or a dynamic random access memory (DRAM). The databases included in the embodiments provided in the present disclosure may include at least one of a relational database and a non-relational database. The non-relational database may include a block-chain-based distributed database or the like, but is not limited thereto. The processor in the embodiments provided in the present disclosure may be a general-purpose processor, a central processing unit, a graphics processing unit, a digital signal processor, a programmable logic device, a quantum computing-based data processing logic device, or the like, but is not limited thereto.

The technical characteristics of the above embodiments can be arbitrarily combined. For brevity of description, not all possible combinations of the technical characteristics of the above embodiments are described. However, these combinations of the technical characteristics should be construed as falling within the scope defined by the specification as long as there is no contradiction among the combinations.

Specific examples are used herein to explain the principles and implementations of the present disclosure. The description of the embodiments is merely intended to help understand the method of the present disclosure and its core ideas. In addition, those of ordinary skill in the art can make various modifications to the specific implementations and application scope in accordance with the teachings of the present disclosure. In conclusion, the content of the present specification shall not be construed as a limitation to the present disclosure.

What is claimed is:

1. A method for monitoring structural deterioration of a reservoir rock mass under a long-time high-temperature condition, comprising:

arranging ultrasonic transducers and fiber optic extrinsic Fabry-Perot interferometric (EFPI) sensors oppositely in a loading briquette, wherein the fiber optic EFPI sensors each are in contact with a rock mass sample in the loading briquette through a sensor channel in the loading briquette; the ultrasonic transducers comprise longitudinal (P)-wave ultrasonic transducers and transverse(S) ultrasonic transducers; and the P-wave ultrasonic transducer and the S-wave ultrasonic transducer are arranged in a same direction of the loading briquette;

loading ultrasonic waves on the rock mass sample with the ultrasonic transducers;

monitoring ultrasonic and acoustic emission signals at the rock mass sample with the fiber optic EFPI sensors;

inverting, by fast marching acoustic emission tomography using standard optimization (FaATSO) and according to the ultrasonic and acoustic emission signals, a velocity model indicating a change of a wave velocity inside the rock mass sample over time; and conducting joint inversion by a fast-marching method according to the velocity model, the acoustic emission signals, and observation data to determine a position of rock mass fracturing in the rock mass sample, wherein the observation data comprises coordinates of the fiber optic EFPI sensors and an active/passive arrival time;

wherein the conducting joint inversion by a fast-marching method according to the velocity model, the acoustic emission signals, and observation data to determine a position of rock mass fracturing in the rock mass sample specifically comprises:

conducting the joint inversion by the fast-marching method according to the velocity model, the acoustic emission signals, and the observation data to determine a theoretical arrival time;

determining an arrival time residual between the theoretical arrival time and a signal arrival time obtained according to the ultrasonic and acoustic emission signals, and determining a minimum arrival time residual within a detection range, wherein the minimum arrival time residual refers to the position of the rock mass fracturing in the rock mass sample;

determining whether the minimum arrival time residual meets an error;

if the minimum arrival time residual meets the error, taking the position of the rock mass fracturing in the rock mass sample determined after the active and passive joint inversion; and if the minimum arrival time residual does not meet the error, inverting the velocity model by a quasi-Newton method in combination with the minimum arrival time residual, and with an inverted velocity model instead of the current velocity model, repeating the step of conducting the joint inversion by the fast-marching method according to the velocity model, the acoustic emission signals, and the observation data to determine a theoretical arrival time until a final minimum arrival time residual meets the error, wherein a vibration demodulation technology with a sampled-grating distributed-Bragg-reflector tunable laser as a light source is adopted; the sampled-grating distributed-Bragg-reflector tunable laser emits a scanning laser beam with a fixed step size according to signal requirements of a control module, and the scanning laser beam is modulated by a laser output module and then enters a fiber optic splitter; the control module of the sampled-grating distributed-Bragg-reflector tunable laser sends a pulse signal to a counting output module while sending a control signal, and the counting output module outputs a counting signal to a sampling circuit after receiving the pulse signal; after receiving a laser beam output by the sampled-grating distributed-Bragg-reflector tunable laser, the fiber optic splitter divides the laser beam output by the sampled-grating distributed-Bragg-reflector tunable laser into laser beams for n channels, the laser beams for n channels enter three-port fiber optic couplers of the n channels, respectively, and the three-port fiber optic couplers output the laser beams for n channels to the corresponding fiber optic EFPI sensors; when a vibration signal acts on a diaphragm of a sensor, a length of a Fabry-Perot (FP) cavity changes to generate an interference spectrum; a reflected laser beam is returned along the original optical path and enters a corresponding photodetector through a fiber optic coupler, and the photodetector converts a received reflected laser beam into an electrical signal and inputs the electrical signal into an amplification circuit; the amplification circuit amplifies the received electrical signal and outputs an amplified electrical signal to the sampling circuit, and the sampling circuit conducts data sampling for the amplified electrical signal with the counting signal; sampling data is transmitted to the communication module to allow information transmission with a monitoring host, and software of the monitoring host conducts restoration of a waveform spectrum through computing; the ultrasonic and acoustic emission signals are restored through a vibration signal of an environment in which a sensor reflecting a waveform spectrum is located.

2. The method for monitoring structural deterioration of a reservoir rock mass under a long-time high-temperature condition according to claim 1, wherein the loading ultrasonic waves on the rock mass sample with the ultrasonic transducers specifically comprises:

conducting an ultrasonic detection once at a specific interval; and for an operating mode of multi-stage loading, conducting an ultrasonic detection when a pressure value at each stage is stabilized.

3. A system for monitoring structural deterioration of a reservoir rock mass under a long-time high-temperature condition applied to the method for monitoring structural deterioration of a reservoir rock mass under a long-time high-temperature condition according to claim 1, wherein the system comprises: ultrasonic transducers, fiber optic EFPI sensors, a data acquisition module, a central processing module, a data communication module, and a master computer;

the ultrasonic transducers each are configured to load an ultrasonic wave on a rock mass sample;

the fiber optic EFPI sensors each are connected with the ultrasonic transducers and the data acquisition module; the fiber optic EFPI sensors each are configured to monitor ultrasonic and acoustic emission signals at the rock mass sample;

the central processing module is connected with the fiber optic EFPI sensors, the data acquisition module, and the ultrasonic transducers; the central processing module is configured to: get the ultrasonic and acoustic emission signals acquired by the data acquisition module, invert a velocity model indicating a change of a wave velocity inside the rock mass sample over time by FaATSO according to the ultrasonic and acoustic emission signals, and conduct joint inversion by a fast-marching method according to the velocity model, the acoustic emission signals, and observation data to determine a position of rock mass fracturing in the rock mass sample; the central processing module is further configured to send an excitation instruction to the ultrasonic transducers; and the master computer communicates with the central processing module and the fiber optic EFPI sensors through the data communication module.

4. The system for monitoring structural deterioration of a reservoir rock mass under a long-time high-temperature condition according to claim 3, wherein the data acquisition module comprises: an ultrasonic transmitting card and an acoustic emission acquisition card.

5. The system for monitoring structural deterioration of a reservoir rock mass under a long-time high-temperature condition according to claim 4, wherein the ultrasonic transmitting card is an AD-IPR-1210 ultrasonic transmitting card.

6. The system for monitoring structural deterioration of a reservoir rock mass under a long-time high-temperature condition according to claim 4, wherein the acoustic emission acquisition card is a PCI-2 acoustic emission acquisition card.

7. The system for monitoring structural deterioration of a reservoir rock mass under a long-time high-temperature condition according to claim 3, wherein the ultrasonic transducers simulate an active source in a form of a sharp-wave pulse, a pulse output voltage is 500 V, and waveforms are superimposed 25 times during pulse excitation.

8. The system for monitoring structural deterioration of a reservoir rock mass under a long-time high-temperature condition according to claim 3, wherein the loading ultrasonic waves on the rock mass sample with the ultrasonic transducers specifically comprises:

conducting an ultrasonic detection once at a specific interval; and for an operating mode of multi-stage loading, conducting an ultrasonic detection when a pressure value at each stage is stabilized.

9. A non-transitory computer readable storage medium, comprising a computer program, wherein when executed by a processor, the computer program implements the method for monitoring structural deterioration of a reservoir rock mass under a long-time high-temperature condition according to claim 1.

10. The non-transitory computer readable storage medium according to claim 9, wherein the loading ultrasonic waves on the rock mass sample with the ultrasonic transducers specifically comprises:

conducting an ultrasonic detection once at a specific interval; and for an operating mode of multi-stage loading, conducting an ultrasonic detection when a pressure value at each stage is stabilized.

* * * * *